(12) United States Patent
Misawa

(10) Patent No.: US 9,821,673 B2
(45) Date of Patent: Nov. 21, 2017

(54) NON-CONTACT POWER TRANSMITTING/RECEIVING SYSTEM

(71) Applicant: TOYOTA JIDOSHA KABUSHIKI KAISHA, Toyota-shi, Aichi-ken (JP)

(72) Inventor: Takahiro Misawa, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 241 days.

(21) Appl. No.: 14/947,552

(22) Filed: Nov. 20, 2015

(65) Prior Publication Data

US 2016/0152149 A1 Jun. 2, 2016

(30) Foreign Application Priority Data

Nov. 28, 2014 (JP) ................. 2014-242082

(51) Int. Cl.
| | | |
|---|---|---|
| H02J 7/00 | (2006.01) | |
| B60L 11/18 | (2006.01) | |
| H02J 50/12 | (2016.01) | |
| H02J 50/80 | (2016.01) | |
| H02J 7/02 | (2016.01) | |

(52) U.S. Cl.
CPC ......... B60L 11/182 (2013.01); B60L 11/1838 (2013.01); B60L 11/1861 (2013.01); H02J 50/12 (2016.02); H02J 50/80 (2016.02); H02J 7/025 (2013.01)

(58) Field of Classification Search
CPC .............. B60L 11/1809; B60L 11/1911; B60L 11/1816; B60L 11/182; B60L 11/1838; B60L 11/1861; H02J 5/005; H02J 7/025; H02J 50/80

USPC ......................................................... 320/108
See application file for complete search history.

(56) References Cited

U.S. PATENT DOCUMENTS

| | | |
|---|---|---|
| 8,489,315 B2 | 7/2013 | Yamamoto |
| 8,742,719 B2 | 6/2014 | Nakamura et al. |
| 2011/0285349 A1* | 11/2011 | Widmer ................ B60L 11/182 320/108 |
| 2013/0119925 A1 | 5/2013 | Kawamura |
| 2013/0127256 A1 | 5/2013 | Kim et al. |

(Continued)

FOREIGN PATENT DOCUMENTS

| | | |
|---|---|---|
| JP | 2010-183812 A | 8/2010 |
| JP | 2014-183731 A | 9/2014 |
| WO | 2011/125632 A1 | 10/2011 |

*Primary Examiner* — Paul Dinh
(74) *Attorney, Agent, or Firm* — Oliff PLC

(57) ABSTRACT

A battery ECU sets a charge demand power based on the state of a battery and sends the set charge demand power to a power receiving ECU. The power receiving ECU sets a power transmitting/receiving efficiency by performing a gradual changing process of a ratio of an output power of a rectifier to an output power of an AC/DC converter, and sends an output demand power obtained by dividing the charge demand power by the power transmitting/receiving efficiency to a power transmission ECU. The power transmission ECU controls the AC/DC converter and an inverter to control the output power of the AC/DC converter to the output demand power. This enables the battery to be charged with a charging power approximate to the charge demand power. As a result, this provides power transmitting/receiving so as to charge the battery with an adequate charging power.

9 Claims, 4 Drawing Sheets

(56) References Cited

U.S. PATENT DOCUMENTS

2014/0266036 A1  9/2014  Jung et al.
2014/0300199 A1  10/2014 Shichino et al.
2014/0354041 A1* 12/2014 Yoshi .................. H02J 7/025
                                                      307/9.1

* cited by examiner

NON-CONTACT POWER TRANSMITTING/RECEIVING SYSTEM

TECHNICAL FIELD

Preferred embodiments relate to a non-contact power transmitting/receiving system and more specifically to: (i) a non-contact power transmitting/receiving system including a power transmission device that is configured to convert electric power from an external power supply and transmit the converted electric power, and (ii) a power receiving device that is configured to receive the electric power transmitted from the power transmission device in a contactless manner and charge a battery.

The disclosure of Japanese Patent Application No. 2014-242082 filed on Nov. 28, 2014 including specification, drawings and claims is incorporated herein by reference in its entirety.

BACKGROUND ART

One proposed configuration of the non-contact power transmitting/receiving system includes a wireless power transmission device and a wireless power receiving device (see, for example, JP 2014-183731A). In this system, when an electric power transmitted from the wireless power transmission device is smaller than a power required by the wireless power receiving device, a power increase request message is sent from the wireless power receiving device to the wireless power transmission device. When receiving the power increase request message, the wireless power transmission device increases the intensity of electric current flowing through a power transmitting coil and thereby increases the transmitted electric power. When an electric power that is larger than the required power which is required by the wireless power receiving device is transmitted from the wireless power transmission device, on the other hand, a power decrease request message is sent from the wireless power receiving device to the wireless power transmission device. When receiving the power decrease request message, the wireless power transmission device decreases the intensity of electric current flowing through the power transmitting coil and thereby decreases the transmitted electric power.

SUMMARY

In the prior art system described above, however, the battery is unlikely to be charged with an adequate charging power even when the required power that is required by the wireless power receiving device is transmitted from the wireless power transmission device. The received electric power significantly changes according to the positions of the power transmitting coil and a power receiving coil. Deviation of the positions of the power transmitting coil and the power receiving coil from their designed positions causes a failure in receiving the designed received electric power and thereby does not enable the battery to be charged with an adequate charging power. This undesirably increases the charging time of the battery.

With regard to the non-contact power transmitting/receiving system, an object of a preferred embodiment is to provide power transmitting/receiving in order to charge a battery with an adequate charging power.

In order to achieve the object described above, a preferred embodiment may be implemented by a non-contact power transmitting/receiving system of any of the following aspects.

According to one aspect of a preferred embodiment, there is provided a non-contact power transmitting/receiving system including a power transmission device and a power receiving device. The power transmission device includes a power converter that is configured to convert electric power from an external power supply; a power transmitter that is configured to transmit the electric power converted by the power converter; a transmitted power detector that is configured to detect the electric power transmitted by the power transmitter; and a power transmission communicator that is configured to communicate with an external device, such as a device receiving power from the power transmission device. The power receiving device includes a power receiver that is configured to receive electric power transmitted from the power transmission device in a contactless manner; a charger that is configured to charge a battery with the electric power received by the power receiver, and a power-receiving communicator that is configured to communicate with an external device, such as the power transmission communicator. The power receiving device further includes a power-receiving controller that is configured to control the power-receiving communicator to send an output demand power to the power transmission communicator, wherein the output demand power is obtained by dividing a charge demand power, that is based on a state of the battery, by a power transmitting/receiving efficiency, that is a ratio of the received electric power to the transmitted electric power which is sent from the power transmission communicator and is received by the power-receiving communicator. The power-receiving controller may update the output demand power by performing a gradual changing process to provide a quicker change in a case of decreasing the output demand power compared with a change in a case of increasing the output demand power. The power transmission device further includes a power transmission controller that is configured to control the power transmission communicator to send the transmitted electric power detected by the transmitted power detector to the power-receiving communicator and to control the power converter and the power transmitter to transmit the output demand power.

In the non-contact power transmitting/receiving system of this aspect, the power transmission device includes the power converter that is configured to convert electric power from the external power supply; the power transmitter that is configured to transmit the electric power converted by the power converter; the transmitted power detector that is configured to detect the electric power transmitted by the power transmitter; and the power transmission communicator that is configured to make communication. The power receiving device includes the power receiver that is configured to receive electric power transmitted from the power transmission device in a contactless manner; the charger that is configured to charge the battery with the electric power received by the power receiver, and the power-receiving communicator that is configured to make communication. The power receiving device further includes the power-receiving controller that is configured to control the power-receiving communicator to send the output demand power (charge demand power/power transmitting/receiving efficiency) to the power transmission communicator. The output demand power is obtained by dividing the charge demand power based on the state of the battery by the power transmitting/receiving efficiency. The power transmitting/receiving efficiency (received electric power/transmitted electric power) denotes a ratio of the received electric power to the transmitted electric power which is sent from the power transmission communicator and is received by the power-receiving communicator. The power-receiving controller updates the output demand power by performing the gradual changing process to provide the quicker change in the case of decreasing the output demand power compared with the change in the case of increasing the output demand power. The power transmission device further includes the power transmission controller that is configured to control the power transmission communicator to send the transmitted electric power detected by the transmitted power detector to the power-receiving communicator. The power transmission controller is configured to control the power converter and the power transmitter to transmit the received output demand power.

The non-contact power transmitting/receiving system of the above aspect sends the output demand power, which is obtained by dividing the charge demand power based on the state of the battery by the power transmitting/receiving efficiency, to the power transmission device. The power transmission device then transmits the output demand power to charge the battery with the charge demand power. This provides power transmitting/receiving in order to charge the battery with an adequate charging power. More specifically, this provides a slow change in the case of increasing the output demand power, while providing a relatively quick change in the case of decreasing the output demand power. This configuration suppresses an abrupt change of the transmitted electric power in the case of increasing the output demand power, while providing a quick change in response to a decrease in charge demand power with a decrease in input limit of the battery or in response to a requirement for a decrease in received electric power with an increase in battery temperature to a high temperature.

DETAILED DESCRIPTION OF EMBODIMENTS

The following describes some aspects of a preferred embodiment.

Figure 1:
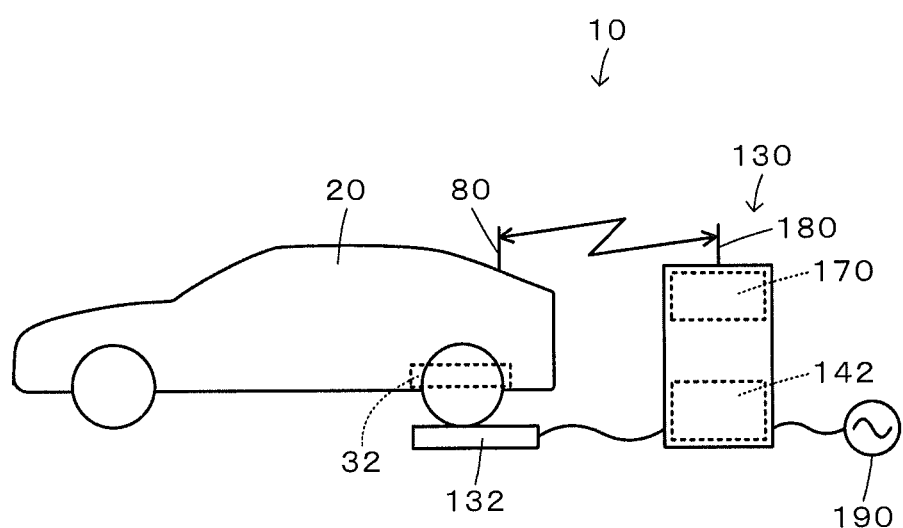
FIG. 1 is a configuration diagram schematically illustrating the configuration of a non-contact power transmitting/receiving system including a power transmission device according to one embodiment.
Figure 2:
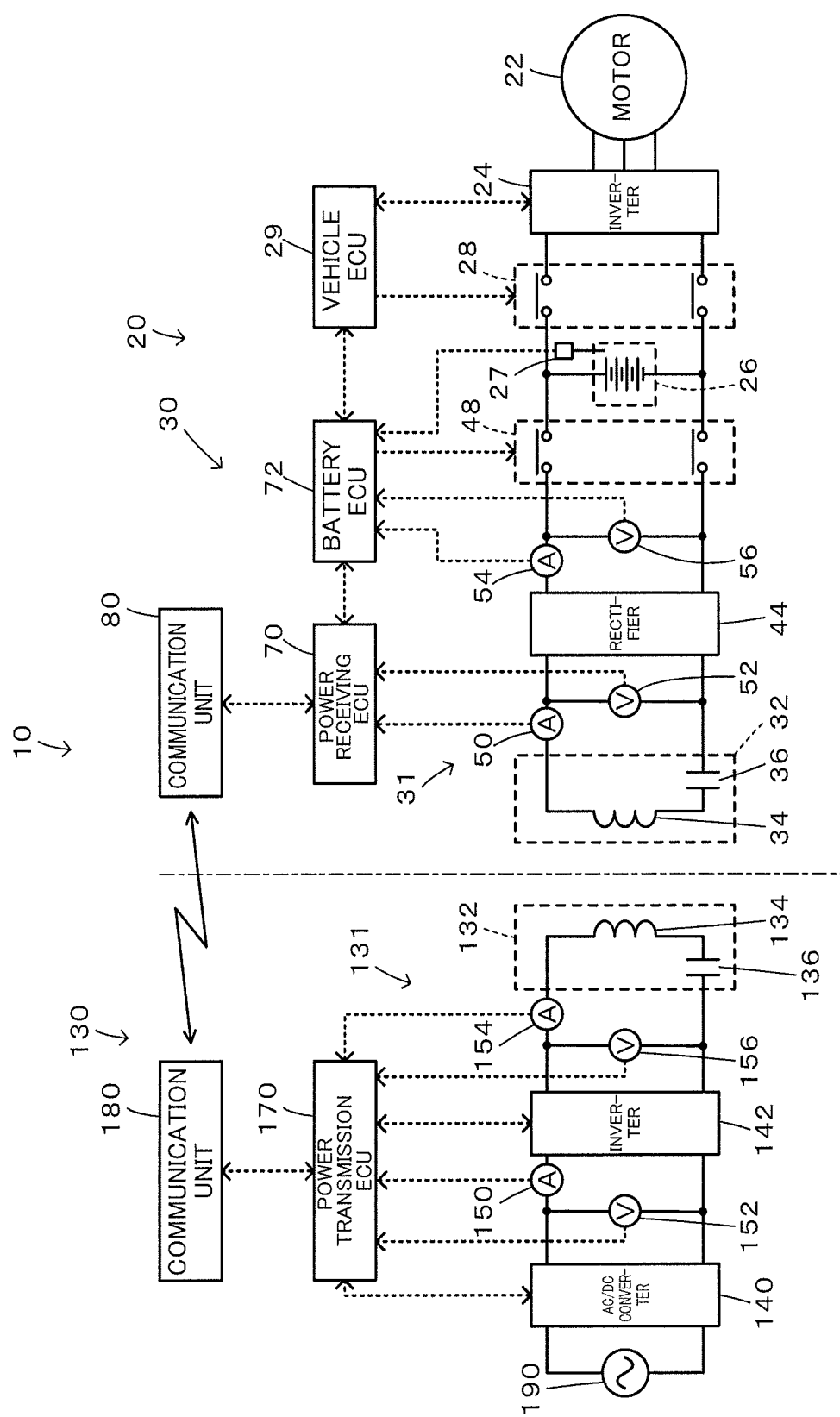
FIG. 2 is a configuration diagram schematically illustrating the configuration of the non-contact power transmitting/receiving system including the power transmission device according to the embodiment.

FIGS. 1 and 2 are configuration diagrams schematically illustrating the configuration of a non-contact power transmitting/receiving system 10 including a power transmission device 130 according to one embodiment. As shown in FIGS. 1 and 2, the non-contact power transmitting/receiving system 10 includes the power transmission device 130 that is placed in, for example, a parking space and a motor vehicle 20 equipped with a power receiving device 30 that is configured to receive electric power from the power transmission device 130 in a contactless manner.

The power transmission device 130 includes a power transmission unit 131 that is connected with an AC power supply 190 such as household power supply (for example, 200 V, 50 Hz) and an electronic control unit for power transmission (hereinafter called "power transmission ECU") 170 that is configured to control the power transmission unit 131. The power transmission device 130 also includes a communication unit 180 that is configured to communicate with the power transmission ECU 170 and wirelessly communicate with a communication unit 80 (described later) of the motor vehicle 20.

The power transmission unit 131 includes an AC/DC converter 140, an inverter 142 and a power transmission resonance circuit 132. The AC/DC converter 140 is configured as a known AC/DC converter that converts an AC power from the AC power supply 190 into a DC power of any voltage. The inverter 142 is configured as a known inverter that converts a DC power into an AC power of any frequency by pulse width modulation (PWM).

The power transmission resonance circuit 132 includes a power transmission coil 134 that is placed on, for example, the floor surface of a parking space and a capacitor 136 that is connected in series with the power transmission coil 134. This power transmission resonance circuit 132 is designed to control the resonance frequency to a predetermined frequency Fset (about several tens to several hundreds kHz). Accordingly, the inverter 142 basically converts the DC power from the AC/DC converter 140 into an AC power of the predetermined frequency Fset.

The power transmission ECU 170 is implemented by a CPU-based microprocessor, details commonly understood and therefore not illustrated include, a ROM that stores processing programs, a RAM that temporarily stores data, input and output ports and a communication port other than the CPU. The power transmission ECU 170 inputs, via the input port, a converter output current Icon from a current sensor 150 mounted to a power line for the DC power converted by the AC/DC converter 140, a converter output voltage Vcon from a voltage sensor 152 mounted to the power line for the DC power converted by the AC/DC converter 140, an inverter output current Is from a current sensor 154 mounted to a power line for the AC power converted by the inverter 142, and an inverter voltage Vs from a voltage detection unit 156 that is configured to convert an AC voltage from the inverter 142 into a DC voltage and detect the converted DC voltage. The voltage detection unit 156 includes a rectifier circuit and a voltage sensor. The power transmission ECU 170 outputs, via the output port, for example, control signals to the AC/DC converter 140 and control signals to the inverter 142.

The motor vehicle 20 is an electric vehicle and includes an electric motor 22, an inverter 24 that is configured to drive the motor 22, a battery 26 that is configured to transmit electric power to and from the motor 22 via the inverter 24 and a vehicle electronic control unit (hereinafter called "vehicle ECU") 29 for controlling travel of the vehicle. A system main relay 28 is provided between the inverter 24 and the battery 26. The motor vehicle 20 also includes a power receiving unit 31 that is connected with the battery 26, an electronic control unit for power receiving (hereinafter called "power receiving ECU") 70 that is configured to manage the receiving of power, an electronic control unit for managing the battery (hereinafter called "battery ECU") 72 that is configured to manage charging of the battery 26 and a communication unit 80 that is configured to communicate with the power receiving ECU 70 and wirelessly communicate with the communication unit 180 of the power transmission device 130. The vehicle ECU 29, the power receiving ECU 70 and the battery ECU 72 intercommunicate with one another.

The power receiving unit 31 includes a power-receiving resonance circuit 32 and a rectifier 44. The power-receiving resonance circuit 32 includes, for example, a power receiving coil 34 that is placed on, for example, the bottom surface of the vehicle body (floor panel) and a capacitor 36 that is connected in series with the power receiving coil 34. This power-receiving resonance circuit 32 is designed to control the resonance frequency to a frequency around the predetermined frequency Fset described above (resonance frequency of the power transmission resonance circuit 132) (ideally to the predetermined frequency Fset). The rectifier 44 is configured, for example, as a known rectifier circuit using four diodes to convert an AC power received by the power-receiving resonance circuit 32 into a DC power. The power receiving unit 31 may be separated from the battery 26 by a relay 48.

The vehicle ECU 29 is implemented by a CPU-based microprocessor, details commonly understood and therefore not illustrated include, a ROM that stores processing programs, a RAM that temporarily stores data, input and output ports and a communication port other than the CPU. The vehicle ECU 29 inputs, via the input port, data required for drive control of the motor 22. The vehicle ECU 29 outputs, via the output port, for example, control signals for switching control of switching elements (not shown) of the inverter 24 to drive the motor 22 and on-off signals to the system main relay 28.

The power receiving ECU 70 is implemented by a CPU-based microprocessor, details commonly understood and therefore not illustrated include, a ROM that stores processing programs, a RAM that temporarily stores data, input and output ports and a communication port other than the CPU. The power receiving ECU 70 inputs, for example, a receiving current Irec from a current sensor 50 mounted to a power line connected with the power-receiving resonance circuit 32 and a receiving voltage Vrec from a voltage detection unit 52 that is configured to convert an AC voltage received by the power-receiving resonance circuit 32 into a DC voltage and detect the converted DC voltage.

The battery ECU 72 is implemented by a CPU-based microprocessor, details commonly understood and therefore not illustrated include, a ROM that stores processing programs, a RAM that temporarily stores data, input and output ports and a communication port other than the CPU. The battery ECU 72 inputs, via the input port, signals with regard to a charging current Ichg from a current sensor 54 connected with a power line for the DC power rectified by the rectifier 44, a charging voltage Vchg from a voltage sensor 56 connected with the power line for the DC power rectified by the rectifier 44 and a battery temperature Tb from a temperature sensor 27 mounted to the battery 26. The battery ECU 72 outputs, via the output port, for example, on-off-signals to the relay 48. While the battery 26 is not charged with the electric power received from the power transmission device 130, the battery ECU 72 calculates a state of charge SOC of the battery 26, based on the measurements of a current sensor and a voltage sensor (not shown) placed between the battery 26 and the system main relay 28. While the battery 26 is charged with the electric power received from the power transmission device 130, on the other hand, the battery ECU 72 calculates the state of charge SOC of the battery 26, based on the charging current Ichg and the charging voltage Vchg.

Figures 3, 4:
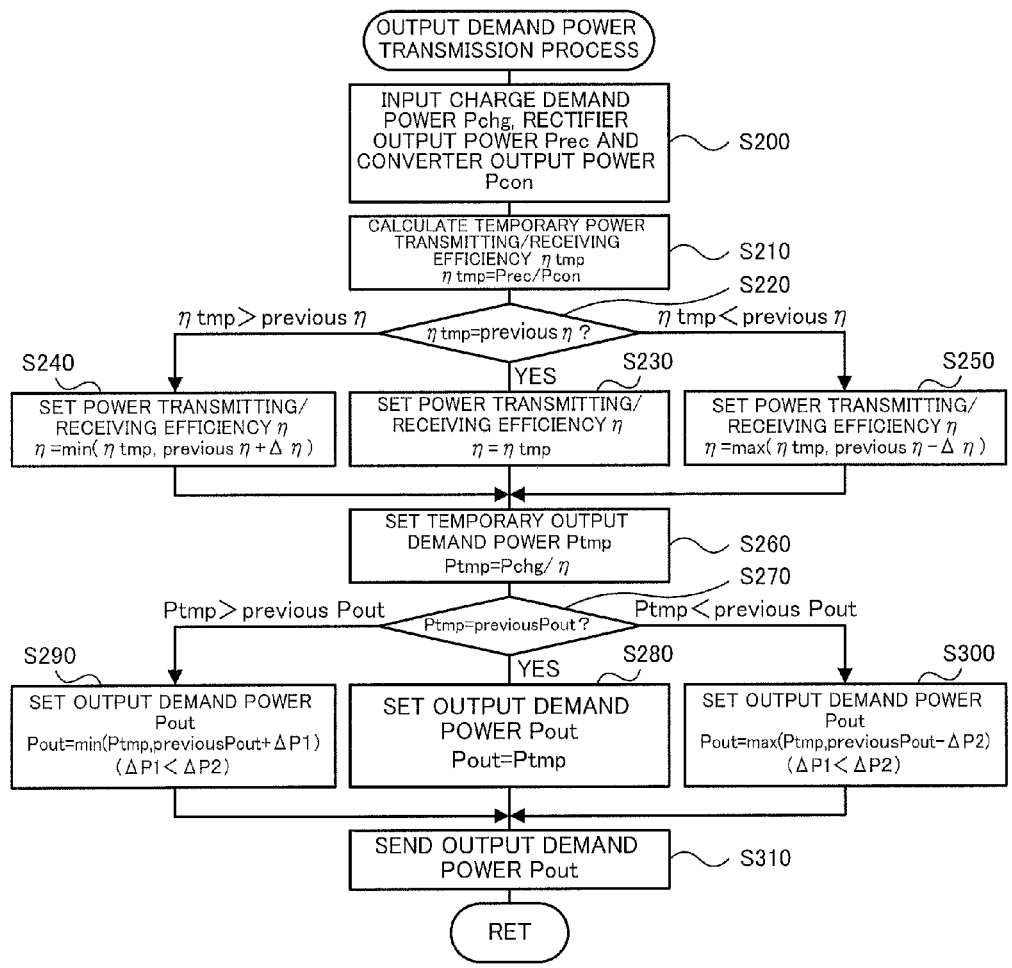
FIG. 3 is a flowchart showing one exemplary flow of a charge demand power requiring process performed by a battery ECU.
FIG. 4 is a flowchart showing one exemplary flow of an output demand power transmission process performed by a power receiving ECU.
Figure 5:
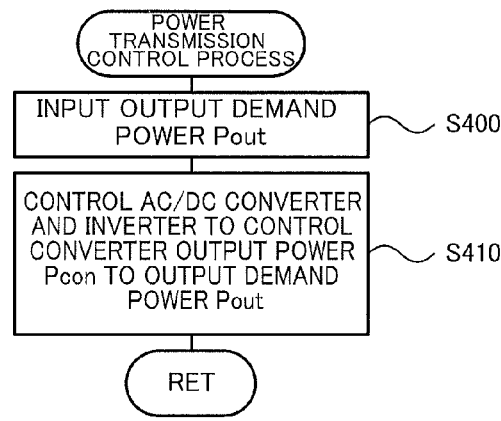
FIG. 5 is a flowchart showing one exemplary flow of a power transmission control process performed by a power transmission ECU.

The following describes the operations of the power transmission device 130 in the non-contact power transmitting/receiving system 10 having the configuration described above or more specifically transmission of control signals between the power receiving ECU 70, the battery ECU 72 and the power transmission ECU 170 during power transmission and power receiving by the power transmission device 130 and the power receiving device 30. FIG. 3 is a flowchart showing one exemplary flow of a charge demand power requiring process performed by the battery ECU 72. FIG. 4 is a flowchart showing one exemplary flow of an output demand power transmission process performed by the power receiving ECU 70. FIG. 5 is a flowchart showing one exemplary flow of a power transmission control process performed by the power transmission ECU 170. These processes of the flowcharts are repeatedly performed at predetermined time intervals (for example, at every several tens msec). These processes of the flowcharts are described below sequentially.

At start of the charge demand power requiring process shown in FIG. 3, the battery ECU 72 first inputs the state of charge SOC and the battery temperature Tb of the battery 26 (step S100) and sets a charge demand power Pchg, based on the input state of charge SOC and battery temperature Tb (step S110). According to this embodiment, when the battery temperature Tb is in a normal operating temperature range and the state of charge SOC is less than a reference value that is close to a full charge level, the charge demand power Pchg is set to a first value (for example, 2 kw, 3 kW or 4 kW) suitable for charging the battery 26. When the state of charge SOC reaches or exceeds the reference value that is close to the full charge level, the charge demand power Pchg is set to a second value (for example, 500 W, 750 W or 1 kW) smaller than the first value until detection of full charge. When the battery temperature Tb is lower than the normal operating temperature range, the charge demand power Pchg is set to a third value (for example, 1 kW) smaller than the first value suitable for normal charging. When the battery temperature Tb is higher than the normal operating temperature range, the charge demand power Pchg is set to a value 0 in order to prohibit charging until the battery temperature Tb falls within the normal operating temperature range or is set to a fourth value (for example, 500 W or 1 kW) smaller than the first value suitable for normal charging. After setting the charge demand power Pchg as electric power suitable for charging the battery 26, the battery ECU 72 sends the set charge demand power Pchg to the power receiving ECU 70 (step S120) and terminates this process.

At start of the output demand power transmission process shown in FIG. 4, the power receiving ECU 70 first inputs the charge demand power Pchg, a rectifier output power Prec and a converter output power Pcon (step S200). The power receiving ECU 70 receives the charge demand power Pchg set and sent by the battery ECU 72. The power receiving ECU 70 receives the charging current Ichg detected by the current sensor 54 and the charging voltage Vchg detected by the voltage sensor 56 from the battery ECU 72 and calculates the rectifier output power Prec as the product of the charging current Ichg and the charging voltage Vchg. The power receiving ECU 70 receives the converter output current Icon detected by the current sensor 150 and the converter output voltage Vcon detected by the voltage sensor 152 from the power transmission ECU 170 via the communication units 180 and 80 and calculates the converter output power Pcon as the product of the converter output current Icon and the converter output voltage Vcon.

Subsequently, the power receiving ECU 70 calculates a temporary power transmitting/receiving efficiency ηtmp by dividing the rectifier output power Prec by the converter output power Pcon (step S210) and sets a power transmitting/receiving efficiency η by gradual changing process of the temporary power transmitting/receiving efficiency ηtmp (steps S220 to S250). The temporary power transmitting/receiving efficiency ηtmp denotes an instantaneous power transmitting/receiving efficiency and is likely to be changed. According to this embodiment, the power transmitting/receiving efficiency η is the power transmitting/receiving efficiency η processed by the gradual changing process. The gradual changing process first compares the temporary power transmitting/receiving efficiency ηtmp with the power transmitting/receiving efficiency η set in a previous cycle of this process (hereinafter called "previous efficiency η") (step S220). When the temporary power transmitting/receiving efficiency ηtmp is equal to the previous efficiency η, the temporary power transmitting/receiving efficiency ηtmp is set to the power transmitting/receiving efficiency η (step S230).

When the temporary power transmitting/receiving efficiency η tmp is larger than the previous efficiency η, the smaller of the temporary power transmitting/receiving efficiency ηtmp and the sum of the previous efficiency η and a variation Δη is set to the power transmitting/receiving efficiency η (step S240). The variation Δη denotes a rate value in a rate limiting process and is determined in advance as a value by which the power transmitting/receiving efficiency η is allowed to be changed at the intervals of repetition of the output demand power transmission process. More specifically, at step S240, when the temporary power transmitting/receiving efficiency ηtmp is larger than the sum of the previous efficiency η and the variation Δη, the rate limiting process is performed to set the sum of the previous efficiency η and the variation Δη to the power transmitting/receiving efficiency η. When the temporary power transmitting/receiving efficiency ηtmp is smaller than the sum of the previous efficiency η and the variation Δη, on the other hand, the temporary power transmitting/receiving efficiency ηtmp is set to the power transmitting/receiving efficiency η. This process prevents the increasing power transmitting/receiving efficiency η from exceeding the temporary power transmitting/receiving efficiency ηtmp. When the temporary power transmitting/receiving efficiency ηtmp is smaller than the previous efficiency 11, on the other hand, the larger of the temporary power transmitting/receiving efficiency ηtmp and the difference by subtracting the variation Δη from the previous efficiency 11 is set to the power transmitting/receiving efficiency η (step S250). More specifically, at step S250, when the temporary power transmitting/receiving efficiency ηtmp is smaller than the difference by subtracting the variation Δη from the previous efficiency η, the rate limiting process is performed to set the difference by subtracting the variation Δη from the previous efficiency η to the power transmitting/receiving efficiency η. When the temporary power transmitting/receiving efficiency ηtmp is larger than the difference by subtracting the variation Δη from the previous efficiency η, on the other hand, the temporary power transmitting/receiving efficiency ηtmp is set to the power transmitting/receiving efficiency η. This process prevents the decreasing power transmitting/receiving efficiency η from becoming smaller than the temporary power transmitting/receiving efficiency ηtmp.

After setting the power transmitting/receiving efficiency η, the power receiving ECU 70 sets a temporary output demand power Ptmp by dividing the charge demand power Pchg by the power transmitting/receiving efficiency η (step S260) and sets an output demand power Pout by gradual changing process of the temporary output demand power Ptmp (steps S270 to S300). The temporary output demand power Ptmp denotes an instantaneous output demand power and is likely to be changed. According to this embodiment, the output demand power Pout is the output demand power Pout processed by the gradual changing process. The gradual changing process first compares the temporary output demand power Ptmp with the output demand power Pout set in a previous cycle of this process (hereinafter called "previous power Pout" (step S270). When the temporary output demand power Ptmp is equal to the previous power Pout, the temporary output demand power Ptmp is set to the output demand power Pout (step S280).

When the temporary output demand power Ptmp is larger than the previous power Pout, the smaller of the temporary output demand power Ptmp and the sum of the previous power Pout and a first variation ΔP1 is set to the output demand power Pout (step S290). The first variation ΔP1 denotes a rate value in a rate limiting process and is determined in advance as a relatively small value among values by which the output demand power Pout is allowed to be changed at the intervals of repetition of the output demand power transmission process. More specifically, at step S290, when the temporary output demand power Ptmp is larger than the sum of the previous power Pout and the first variation ΔP1, the rate limiting process is performed to set the sum of the previous power Pout and the first variation ΔP1 to the output demand power Pout. When the temporary output demand power Ptmp is smaller than the sum of the previous power Pout and the first variation ΔP1, on the other hand, the temporary output demand power Ptmp is set to the output demand power Pout. This process prevents the increasing output demand power Pout from exceeding the temporary output demand power Ptmp. When the temporary output demand power Ptmp is smaller than the previous power Pout, on the other hand, the larger of the temporary output demand power Ptmp and the difference by subtracting a second variation ΔP2 from the previous power Pout is set to the output demand power Pout (step S300). The second variation ΔP2 denotes a rate value in a rate limiting process and is determined in advance as a larger value than the first variation ΔP1 among values by which the output demand power Pout is allowed to be changed at the intervals of repetition of the output demand power transmission process. More specifically, at step S300, when the temporary output demand power Ptmp is smaller than the difference by subtracting the second variation ΔP2 from the previous power Pout, the rate limiting process is performed to set the difference by subtracting the second variation ΔP2 from the previous power Pout to the output demand power Pout. When the temporary output demand power Ptmp is larger than the difference by subtracting the second variation ΔP2 from the previous power Pout, on the other hand, the temporary output demand power Ptmp is set to the output demand power Pout. This process prevents the decreasing output demand power Pout from becoming smaller than the temporary output demand power Ptmp.

The second variation ΔP2 as the rate value for decreasing the output demand power Pout is set larger than the first variation ΔP1 as the rate value for increasing the output demand power Pout, in order to provide a quick change in the case of decreasing the output demand power Pout but provide a slow change in the case of increasing the output demand power Pout. An abrupt increase in output demand power Pout makes the battery 26 likely to be charged with excessive electric power. In order to avoid this situation, the output demand power Pout should be slowly changed in the case of increasing the output demand power Pout. In the case of decreasing the output demand power Pout, on the other hand, there is a need to provide a quick decrease of the charging power in response to a decrease in charge demand power Pchg, for example, when the state of charge of the battery 26 approaches the full charge level or when the temperature of the battery 26 or the system temperature increases.

After setting the output demand power Pout as described above, the power receiving ECU 70 sends the set output demand power Pout to the power transmission ECU 170 (step S310) and terminates this process.

At start of the power transmission control process of FIG. 5, the power transmission ECU 170 inputs the output demand power Pout (step S400) and controls the AC/DC converter 140 and the inverter 142 to control the converter output power Pcon to the output demand power Pout (step S410). When the converter output power Pcon is smaller than the output demand power Pout, the control may be performed to increase the duty of the inverter 142 and thereby increase the electric power that is to be transmitted from the power transmission resonance circuit 132. When the converter output power Pcon is larger than the output demand power Pout, on the contrary, the control may be performed to decrease the duty of the inverter 142 and thereby decrease the electric power that is to be transmitted from the power transmission resonance circuit 132. Such control causes the converter output power Pcon to be equal to the output demand power Pout. The rectifier output power Prec is calculated by multiplying the converter output power Pcon by the power transmitting/receiving efficiency η, and the output demand power Pout is calculated by dividing the charge demand power Pchg by the power transmitting/receiving efficiency η. When the converter output power Pcon is equal to the output demand power Pout, the rectifier output power Prec is accordingly equal to the charge demand power Pchg. This enables the battery 26 to be charged with the charge demand power Pchg.

Figure 6:
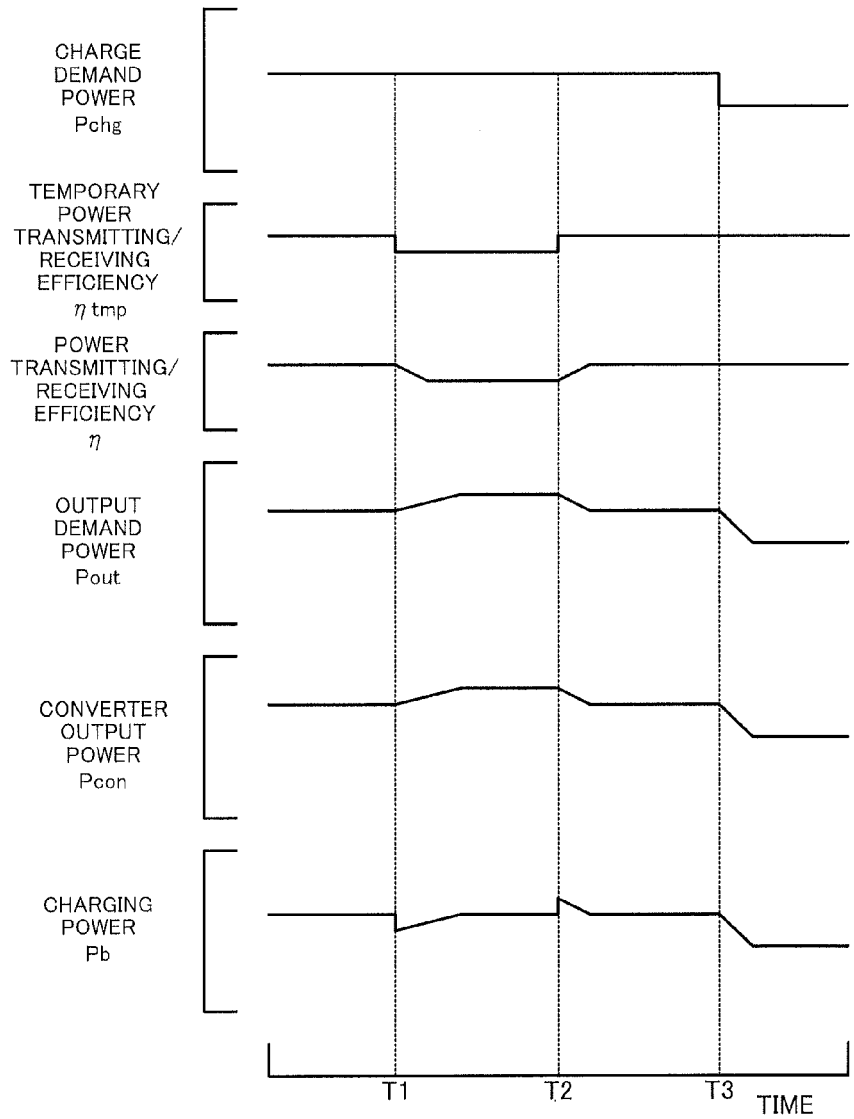
FIG. 6 is a diagram showing one example of time changes of a charge demand power Pchg, a temporary power transmitting/receiving efficiency ηtmp, a power transmitting/receiving efficiency η, an output demand power Pout, a converter output power Pcon and an actual charging power Pb of a battery.

FIG. 6 is a diagram showing one example of time changes of the charge demand power Pchg, the temporary power transmitting/receiving efficiency ηtmp, the power transmitting/receiving efficiency η, the output demand power Pout, the converter output power Pcon and an actual charging power Pb of the battery 26. Around a time T1 when the temporary power transmitting/receiving efficiency ηtmp abruptly decreases, the power transmitting/receiving efficiency η is gradually decreased by the rate limiting process (gradual changing process) with the variation Δη as the rate value. The output demand power Pout is slowly increased by the rate limiting process (gradual changing process) with the first variation ΔP1 as the rate value. Similarly to the output demand power Pout, the converter output power Pcon is slowly increased. The charging power Pb abruptly decreases with the abrupt decrease of the temporary power transmitting/receiving efficiency ηtmp, which is the power transmitting/receiving efficiency prior to the gradual changing process, but is slowly recovered to the original power level. Around a time T2 when the temporary power transmitting/receiving efficiency ηtmp abruptly increases, the power transmitting/receiving efficiency η is gradually increased by the rate limiting process (gradual changing process) with the variation Δη as the rate value. The output demand power Pout is gradually decreased by the rate limiting process (gradual changing process) with the second variation ΔP2 as the rate value. This gradual decrease of the output demand power Pout is, however, quicker than the slow increase of the output demand power Pout. Similarly to the output demand power Pout, the converter output power Pcon is decreased relatively quickly. The charging power Pb abruptly increases with the abrupt increase of the temporary power transmitting/receiving efficiency ηtmp, which is the power transmitting/receiving efficiency prior to the gradual changing process, but is relatively quickly recovered to the original power level. Around a time T3 when the charge demand power Pchg abruptly decreases, for example, by the state of charge of the battery 26 approaching the full charge level, even when the temporary power transmitting/receiving efficiency ηtmp and the power transmitting/receiving efficiency η have no change, the output demand power Pout is relatively quickly decreased by the rate limiting process (gradual changing process) with the second variation ΔP2 as the rate value. Similarly to the output demand power Pout, the converter output power Pcon is relatively quickly decreased. As a result, the charging power Pb is relatively quickly decreased.

In the non-contact power transmitting/receiving system 10 of the embodiment described above, the battery ECU 72 sets the charge demand power Pchg based on the state of charge SOC and the battery temperature Tb of the battery 26 and sends the set charge demand power Pchg to the power receiving ECU 70. The power receiving ECU 70 sets the power transmitting/receiving efficiency η by performing the gradual changing process, sets the output demand power Pout by dividing the charge demand power Pchg by the power transmitting/receiving efficiency η and performing the gradual changing process, and sends the set output demand power Pout to the power transmission ECU 170. The power transmission ECU 170 controls the AC/DC converter 140 and the inverter 142 to control the converter output power Pcon to the output demand power Pout. This causes the battery 26 to be charged with the charging power Pb approximate to the charge demand power Pchg. As a result, this provides power transmitting/receiving so as to charge the battery 26 with the adequate charging power.

The non-contact power transmitting/receiving system 10 of the embodiment sets the power transmitting/receiving efficiency η by performing the gradual changing process. This suppresses an abrupt change of the output demand power Pout with an abrupt change of the power transmitting/receiving efficiency η or hunting of the output demand power Pout.

Additionally, the non-contact power transmitting/receiving system 10 of the embodiment sets the output demand power Pout using the first variation ΔP1 as the small rate value to provide a relatively slow change in the case of increasing the output demand power Pout. This suppresses the battery 26 from being charged with excessive electric power due to an abrupt increase of the output demand power Pout. The non-contact power transmitting/receiving system 10 of the embodiment sets the output demand power Pout using the second variation ΔP2 as the large rate value to provide a relatively quick change in the case of decreasing the output demand power Pout. This enables the charging power of the battery 26 to be quickly decreased in response to a decrease in charge demand power Pchg, for example, when the state of charge of the battery 26 approaches the full charge level or when the temperature of the battery 26 or the system temperature increases. This accordingly suppresses overcharge or overheat of the battery 26 or the system.

The non-contact power transmitting/receiving system 10 of the embodiment sets the power transmitting/receiving efficiency η by performing the rate limiting process using the variation Δη as the rate value. The requirement is, however, to set the power transmitting/receiving efficiency η by any gradual changing process. The rate limiting process may thus be replaced by a smoothing process or any other gradual changing process. The frequency of setting the power transmitting/receiving efficiency η may be decreased. Moreover the gradual changing process may not be necessarily performed for setting the power transmitting/receiving efficiency η.

The non-contact power transmitting/receiving system 10 of the embodiment sets the output demand power Pout by performing the rate limiting process using the first variation ΔP1 or the second variation ΔP2 as the rate value. The requirement is, however, to provide a relatively slow change in the case of increasing the output demand power Pout and provide a relatively quick change in the case of decreasing the output demand power Pout. The rate limiting process may thus be replaced by a smoothing process or any other gradual changing process. Moreover the gradual changing process may not be necessarily performed for setting the output demand power Pout.

In the non-contact power transmitting/receiving system 10 of the embodiment, the power receiving device 30 includes the power receiving ECU 70 and the battery ECU 72. The power receiving ECU 70 and the battery ECU 72 may be integrated to a single electronic control unit. Moreover the vehicle ECU 29, the power receiving ECU 70 and the battery ECU 72 may be integrated to a single electronic control unit.

The non-contact power transmitting/receiving system 10 of the embodiment sets the power transmitting/receiving efficiency η to the ratio of the rectifier output power Prec to the converter output power Pcon (η=Prec/Pcon). The converter output power Pcon may be replaced by an electric power input from the AC power supply 190 to the AC/DC converter 140 or an output electric power of the inverter 142. The rectifier output power Prec may be replaced by a charging power of the battery 26 or an electric power received by the power-receiving resonance circuit 32.

The embodiment describes the non-contact power transmitting/receiving system 10 including the power receiving device 30 mounted on the motor vehicle 20 and the power transmission device 130. Aspects of the preferred embodiment may also be applied to a non-contact power transmitting/receiving system including a power receiving device mounted on a vehicle other than the motor vehicle or another moving body and a power transmission device, or to a non-contact power transmitting/receiving system including a power receiving device incorporated in equipment other than the moving body and a power transmission device.

In the non-contact power transmitting/receiving system of the above aspect, the power converter may include a first converter that is configured to convert the electric power from the external power supply to a DC power and a second converter that is configured to convert the DC power from the first converter to an AC power, the charger may include a rectifier that is configured to rectify the AC power received by the power receiver. The power transmitting/receiving efficiency may be calculated by setting a DC power rectified by the rectifier to the received electric power and the DC power converted by the first converter to the transmitted electric power.

In the non-contact power transmitting-receiving system of the above aspect, the power-receiving controller may update the power transmitting/receiving efficiency by performing a gradual changing process. This provides a slow change of the output demand power in response to a change of the power transmitting/receiving efficiency. This accordingly suppresses an abrupt change of the output demand power or hunting of the output demand power.

In the non-contact power transmitting/receiving system of the above aspect, the power receiving device may further include a battery controller that is configured to set the charge demand power based on the state of the battery and send the set charge demand power to the power-receiving controller.

The following describes the correspondence relationship between the primary components of the embodiment and the primary components of the embodiment described in the Summary. The AC power supply 190 of the embodiment corresponds to the "external power supply". The AC/DC converter 140 and the inverter 142 correspond to the "power converter". The power transmission resonance circuit 132 corresponds to the "power transmitter", and the power transmission device 130 corresponds to the "power transmission device". The power-receiving resonance circuit 32 corresponds to the "power receiver", the rectifier 44 corresponds to the "charger", and the power receiving device 30 corresponds to the "power receiving device". The power receiving ECU 70, the battery ECU 72 and the communication unit 80 correspond to the "power-receiving controller". The power transmission ECU 170 and the communication unit 180 correspond to the "power transmission controller".

The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics described herein.

INDUSTRIAL APPLICABILITY

The invention is applicable to, for example, the manufacturing industry of non-contact power transmitting/receiving systems.

The invention claimed is:
1. A non-contact power transmitting/receiving system comprising:
   a power transmission device comprising a power converter that is configured to convert electric power from an external power supply; a power transmitter that is configured to transmit the electric power converted by the power converter; a transmitted power detector that is configured to detect the electric power transmitted by the power transmitter; and a power transmission communicator that is configured to establish communication with an external device,
   a power receiving device comprising a power receiver that is configured to receive electric power transmitted from the power transmission device in a contactless manner; a charger that is configured to charge a battery with the electric power received by the power receiver, and a power-receiving communicator that is configured to communicate with the power transmission communicator, wherein the power receiving device further comprises a power-receiving controller that is configured to control the power-receiving communicator to send an output demand power to the power transmission communicator, wherein the output demand power is obtained by dividing a charge demand power, that is based on a state of the battery, by a power transmitting/receiving efficiency, that is a ratio of the received electric power to the transmitted electric power which is sent from the power transmission communicator and is received by the power-receiving communicator, the power-receiving controller updating the output demand power by performing a gradual changing process to provide a quicker change in a case of decreasing the output demand power compared with a change in a case of increasing the output demand power, and the power transmission device further comprises a power transmission controller that is configured to control the power transmission communicator to send the transmitted electric power detected by the transmitted power detector to the power-receiving communicator and to control the power converter and the power transmitter to transmit the output demand power.

2. The non-contact power transmitting/receiving system according to claim 1, wherein the power converter comprises a first converter that is configured to convert the electric power from the external power supply to a DC power and a second converter that is configured to convert the DC power from the first converter to an AC power, the charger comprises a rectifier that is configured to rectify the AC power received by the power receiver, and the power transmitting/receiving efficiency is calculated by setting a DC power rectified by the rectifier to the received electric power and the DC power converted by the first converter to the transmitted electric power.

3. The non-contact power transmitting/receiving system according to claim 1, wherein the power-receiving controller updates the power transmitting/receiving efficiency by performing a gradual changing process.

4. The non-contact power transmitting/receiving system according to claim 1, wherein the power receiving device further comprises a battery controller that is configured to set the charge demand power based on the state of the battery and send the set charge demand power to the power-receiving controller.

5. The non-contact power transmitting/receiving system according to claim 2, wherein the power-receiving controller updates the power transmitting/receiving efficiency by performing a gradual changing process.

6. The non-contact power transmitting/receiving system according to claim 5, wherein the power receiving device further comprises a battery controller that is configured to set the charge demand power based on the state of the battery and send the set charge demand power to the power-receiving controller.

7. A non-contact power receiving system for receiving power from a power transmission device, the power transmission device being configured with a power converter that is configured to convert electric power from an external power supply, a power transmitter that is configured to transmit the electric power converted by the power converter, a transmitted power detector that is configured to detect the electric power transmitted by the power transmitter, and a power transmission communicator that is configured to establish communication with the power receiving system, the power receiving system comprising:

a power receiving device comprising a power receiver that is configured to receive electric power transmitted from the power transmission device in a contactless manner; a charger that is configured to charge a battery with the electric power received by the power receiver, and a power-receiving communicator that is configured to communicate with the power transmission communicator, wherein the power receiving device further comprises a power-receiving controller that is configured to control the power-receiving communicator to send an output demand power to the power transmission communicator, wherein the output demand power is obtained by dividing a charge demand power, that is based on a state of the battery, by a power transmitting/receiving efficiency, that is a ratio of the received electric power to the transmitted electric power which is sent from the power transmission communicator and is received by the power-receiving communicator, the power-receiving controller updating the output demand power by performing a gradual changing process to provide a quicker change in a case of decreasing the output demand power compared with a change in a case of increasing the output demand power.

8. The non-contact power transmitting/receiving system according to claim 7, wherein the power-receiving controller updates the power transmitting/receiving efficiency by performing a gradual changing process.

9. The non-contact power transmitting/receiving system according to claim 7, wherein the power receiving device further comprises a battery controller that is configured to set the charge demand power based on the state of the battery and send the set charge demand power to the power-receiving controller.

* * * * *